W. VAN PIETERSOM & F. FLERLAGE.
FLAT IRON HEATER.
APPLICATION FILED MAY 20, 1909.
968,903.
Patented Aug. 30, 1910.
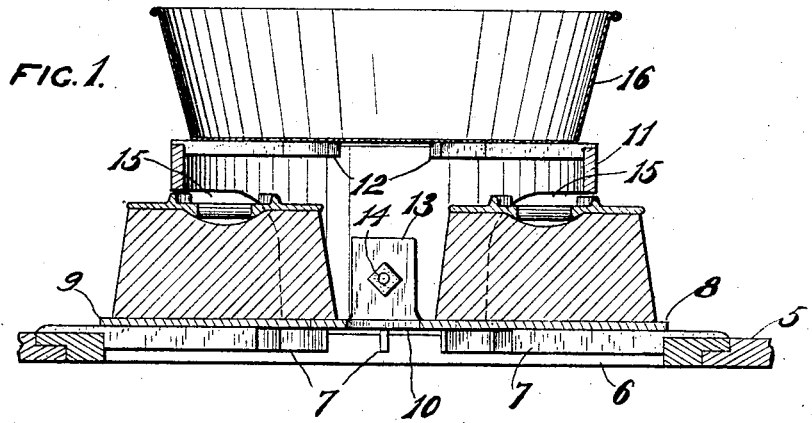
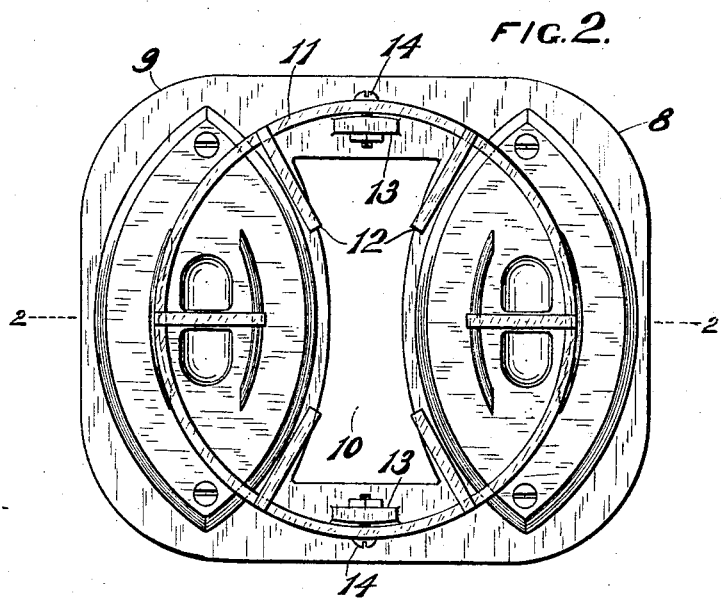
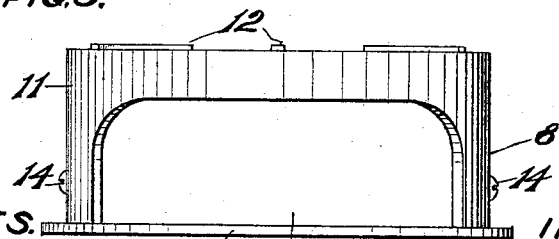
WITNESSES.
INVENTORS.
William Van Pietersom
Frank Flerlage
By Benedict, Morrell & Caldwell
ATTORNEYS.

UNITED STATES PATENT OFFICE.

WILLIAM VAN PIETERSOM AND FRANK FLERLAGE, OF MILWAUKEE, WISCONSIN.

FLAT-IRON HEATER.

968,903.  Specification of Letters Patent.  Patented Aug. 30, 1910.

Application filed May 20, 1909. Serial No. 497,235.

*To all whom it may concern:*

Be it known that we, WILLIAM VAN PIETERSOM and FRANK FLERLAGE, residing in Milwaukee, in the county of Milwaukee and State of Wisconsin, have invented new and useful Improvements in Flat-Iron Heaters, of which the following is a description, reference being had to the accompanying drawings, which are a part of this specification.

This invention relates to improvements in flat-iron heaters particularly adapted for use with gas stoves.

It is one of the objects of this invention to provide a heater which is adapted to be placed on top of one of the stove holes of a gas stove and providing means whereby sad irons and cooking utensils may be heated over a single gas burner at the same time.

Another object of this invention is to provide a heater which is simple in construction and is inexpensive to manufacture.

With the above, and other objects in view, the invention consists of the heater and its parts and combination as set forth in the claims.

In the accompanying drawing, in which the same reference characters indicate the same parts in all of the views; Figure 1 is a central vertical sectional view of the heater taken on line 2—2 of Fig. 2 showing the heater placed on top of a fragment of a gas stove, a cooking utensil on top of the heater and a sad iron on each side thereof; Fig. 2 is a plan view of the heater and two sad irons; and, Fig. 3 is a side view thereof.

Referring to the drawing the numeral 5 indicates a fragment of a stove top, 6, the burner opening thereof and 7 the supporting ribs of the top. A heater 8 which is adapted to rest on top of the supporting ribs consists of a rectangular heating base plate 9 provided with an elongated burner opening 10 and a vertical cylindrical elevated supporting member 11 provided with utensil supporting ribs 12 projecting inwardly from the upper edge thereof. The rectangular base plate is provided with upstanding lugs 13 to which the lower portion of the cylindrical member is fastened by means of bolts 14.

The cylindrical member is provided with side or flat-iron openings 15 of sufficient size to permit one of the sides of the body portion of a sad iron to be placed through each side opening far enough to be heated by the flame of the stove burner (not shown) without covering the rectangular base plate opening. The contour of the side edges of the rectangular base plate surrounding the opening thereof is shaped to conform to the side edges of the bottom of the sad irons so that the iron rests entirely upon the upper surface of the rectangular plate and does not come in direct contact with the flame of the burner and consequently the danger of the irons becoming covered with soot from smoke is obviated. The heater as shown is adapted to heat irons of the type provided with removable handles but it is obvious that the cylindrical portion may be made higher to accommodate irons provided with fixed handles.

The supporting ribs 12 extend a slight distance above the upper edge of the cylindrical portion to permit the heat passing out between the upper edge of the cylindrical portion and the bottom of the receptacle 16 resting on the supporting ribs.

When the sad irons are placed in position on the heater they substantially fill the side openings and in connection with the cylindrical portion form a flue to conduct the heat from the opening in the rectangular plate to the receptacle placed on top of the inwardly projecting supporting bars and at the same time the irons are being heated without interfering with the heating of the receptacle.

From the foregoing description it will be seen that the heater forms a very convenient utensil which is adapted to heat cooking receptacles and at the same time heat sad irons.

What we claim as our invention is—

1. A heater, comprising a rectangular base plate provided with an elongated burner opening and upstanding lugs, a vertical cylindrical member positioned on top of the base plate and provided with a top heating opening and with flat-iron openings, said side openings shaped to be substantially closed by the articles being heated to form a heat flue from the burner opening to the top heating opening, bolts connecting the cylindrical members to the upstanding lugs, and receptacle supporting ribs projecting above the upper edge of the cylindrical member and inwardly therefrom.

2. A heater, comprising a base plate provided with an elongated opening, the side edges of the plate bounding said opening being curved inwardly toward each other, a vertical cylindrical member connected to said base plate and provided with a heating opening on the top and a flat-iron opening on the side, said side opening shaped to be substantially closed by the article being heated, and receptacle supporting means projecting above the upper edge of the cylindrical portion.

In testimony whereof, we affix our signatures, in presence of two witnesses.

WILLIAM VAN PIETERSOM.
FRANK FLERLAGE.

Witnesses:
WALTER B. SCHUCK,
J. S. SCHUCK.